United States Patent [19]
Jennewein et al.

[11] Patent Number: 5,005,691
[45] Date of Patent: Apr. 9, 1991

[54] APPARATUS FOR SUSPENDING GARMENTS ON HANGERS

[75] Inventors: Manfred A. Jennewein, Meisenweg 10, D-6082 Mörfelden-Walldorf; Achim Ballweg, Homburg/Saar, both of Fed. Rep. of Germany

[73] Assignee: Manfred A. Jennewein, Mörfelden-Walldorf, Fed. Rep. of Germany

[21] Appl. No.: 330,312

[22] Filed: Mar. 29, 1989

[30] Foreign Application Priority Data

Mar. 30, 1988 [DE] Fed. Rep. of Germany ....... 3810794
Jun. 4, 1988 [DE] Fed. Rep. of Germany ....... 3819103

[51] Int. Cl.$^5$ ............................................. B65G 17/32
[52] U.S. Cl. ................................. 198/465.4; 198/477.1
[58] Field of Search ............... 198/346.1, 465.4, 476.1, 198/477.1, 478.1; 223/85, 92

[56] References Cited

U.S. PATENT DOCUMENTS 3,620,354 11/1971 McMillan ......................... 198/465.4
3,799,318 3/1974 Dekoekkoek ................. 198/465.4 X

FOREIGN PATENT DOCUMENTS 3535297 4/1987 Fed. Rep. of Germany ... 198/465.4
1482519 8/1977 United Kingdom ............. 198/465.4

Primary Examiner—Joseph J. Rolla
Assistant Examiner—D. Glenn Dayoan
Attorney, Agent, or Firm—Peter K. Kontler

[57] ABSTRACT

An apparatus for suspending garments on hangers has an indexible conveyor for three equidistant hanger holders. When the conveyor is idle, each holder is located at one of three different stations. A mechanism at the first station serves to introduce an empty hanger into the pocket of the holder at the first station. Such holder is then moved to the second station where an operator applies one or more articles of clothing to the holder and to the hanger in the respective pocket. The conveyor is then indexed again to move the holder and the garment-carrying hanger to the third station where a mechanism removes the hanger and the garment before the holder is moved back to the first station. Each holder resembles the upper part of a human torso to facilitate the application of articles of clothing.

25 Claims, 6 Drawing Sheets

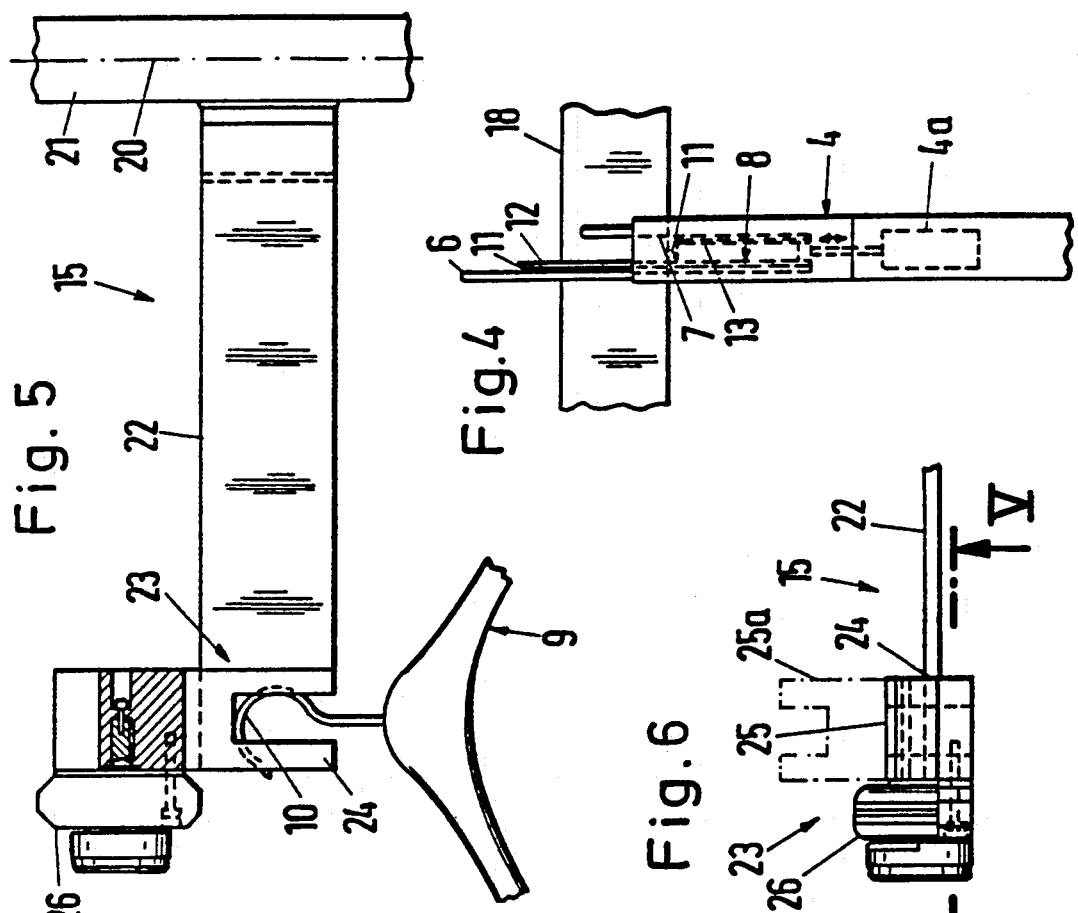
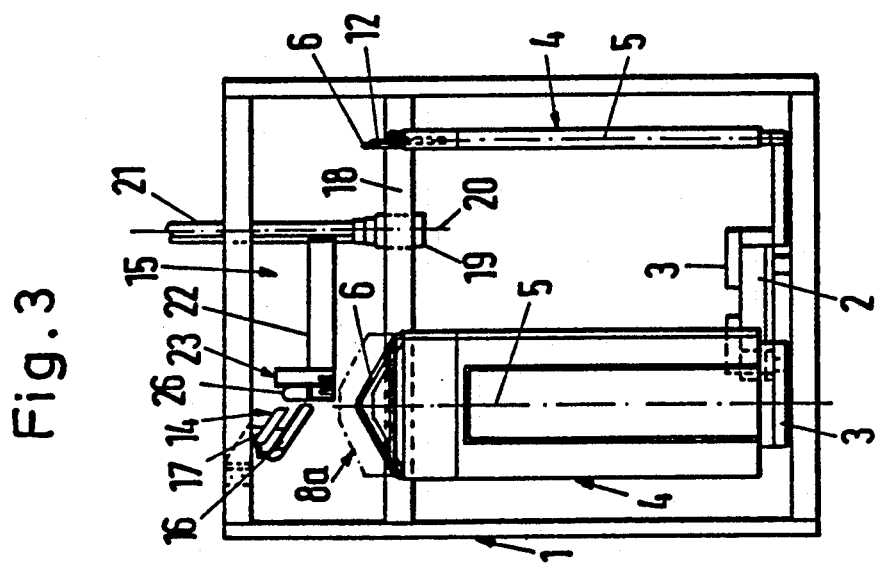

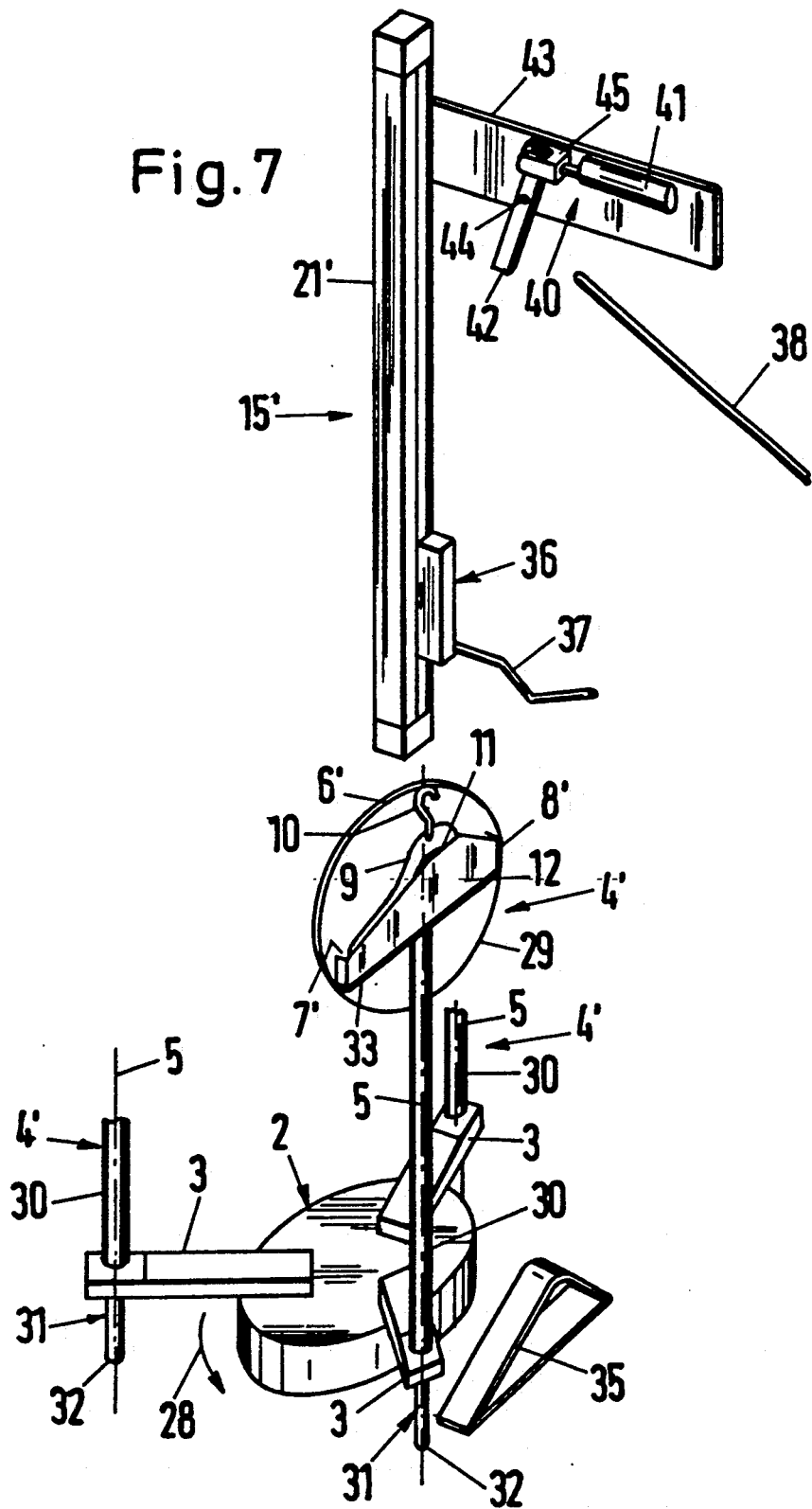

APPARATUS FOR SUSPENDING GARMENTS ON HANGERS

BACKGROUND OF THE INVENTION

The invention relates to apparatus for supporting and transporting garments, and more particularly to improvements in apparatus for manipulating and transporting garment hangers with and without garments. Still more particularly, the invention relates to improvements in apparatus wherein one or more holders for garment hangers are movable along a predetermined path to receive hangers, to facilitate the application of garments (such as pullovers, shirts, blouses, jackets, dresses and/or others) over hangers, and to be relieved of hangers and of garments on the hangers.

Garment making and garment cleaning or washing industries employ apparatus of the type wherein one or more holders, each of which resembles the upper portion of a human torso, are mounted on a conveyor and are transported past several stations at one of which successive holders receive garment hangers from a downwardly sloping ramp. The means for transferring hangers from the ramp into recesses or pockets of the oncoming holders includes tongs having an opening for the hook of a hanger. When the opening receives a hook, the tongs close and a push rod delivers the tongs and the suspended hanger to a position above the recess of a holder. A mechanism opens the tongs in a position in which the thus released hanger descends into the recess of the holder. The push rod then retracts the tongs in order to provide room for manual application of a garment over the hanger in the recess of the holder at the hanger receiving station. In the next step, the hanger (which carries a garment) is engaged by an arm which lifts the hanger and the garment so that the hanger is removed from the recess of the holder and can be transferred onto a rod, rail or bar for transport to the next processing station. As a rule, the holders are rotatable about vertical axes. This enables the operator, who has completed the application of a garment over a hanger in the recess of a holder, to inspect the front and rear sides of the garment for the presence of defects.

A drawback of the just described apparatus is that the operator is idle during insertion of a hanger into the recess of a holder preparatory to the application of a garment over the hanger in the holder and during removal of a garment-carrying hanger from the holder. The same holds true for the mechanism which inserts hangers into the recesses of successive holders and for the mechanism which withdraws hangers (with garments thereon) from the recesses of the holders, i.e., such mechanisms are idle while the operator is in the process of applying a garment over the hanger in the recess of a holder and of thereupon turning the holder about a vertical axis in order to complete an inspection of the front and rear sides of the applied garment. Therefore, the output of such apparatus is rather low. Moreover, a careless operator is likely to be injured if she or he attempts to apply a garment while the respective holder is in the process of receiving an empty hanger or if the operator continues to manipulate the garment when the hanger removing mechanism is operative to remove a garment-carrying hanger from the respective holder. It has been found that the aforementioned arm of the hanger removing mechanism is particularly likely to injure an attendant if the attendant continues to slip a garment over a hanger in the recess of a holder while the arm of the hanger withdrawing mechanism descends toward the head of the operator. A further drawback of conventional apparatus is that the holder or holders of hangers must be exchanged if the apparatus is to be converted from the manipulation and transport of a first type or size of garments to the transport and manipulation of garments of a different type or of garments having a different size.

OBJECTS OF THE INVENTION

An object of the invention is to provide an apparatus which can manipulate large numbers of garments per unit of time, which is less likely to injure an operator than heretofore known apparatus, and which need not be drastically altered preparatory to the application and transport of different types of garments.

Another object of the invention is to provide an apparatus which can receive hangers from conventional hanger supplying devices and is constructed and assembled in such a way that an operator can apply a garment over a hanger while the mechanisms for loading garment hangers into and for removing garment hangers from their holders are in actual use.

A further object of the invention is to provide the apparatus with novel and improved holders for garment hangers.

An additional object of the invention is to provide the apparatus with novel and improved mechanisms for inserting garment hangers into and for removing garment hangers from holders.

Still another object of the invention is to provide the apparatus with novel and improved means for moving garment hangers with reference to holders.

A further object of the invention is to provide a novel and improved method of operating the above outlined apparatus.

Another object of the invention is to provide novel and improved receptacles for garment hangers.

SUMMARY OF THE INVENTION

The invention is embodied in an apparatus for suspending garments on hangers of the type having a hook. The apparatus comprises a plurality of garment holders each of which preferably resembles the upper part of a human torso and each of which has a hanger-receiving pocket with an open top, a conveyor which supports and defines an endless path for the holders, and a plurality of stations including a first station which is adjacent the path and has means for inserting hangers into the pockets of adjacent holders so that the hook of an inserted hanger extends upwardly, and a second station which is adjacent the path and serves to facilitate the application of a garment over a holder and over the hanger in the pocket of such holder. One of the holders is located at the first station when another holder is located at the second station. The stations are preferably equidistant from each other.

In accordance with a presently preferred embodiment, the apparatus comprises three equidistant holders and the stations include a third station adjacent the path and having means for removing garment-carrying hangers from the pockets of the adjacent holders. The conveyor includes means for moving the holders in a predetermined direction, and the third station is disposed ahead of the first station (as seen in the predetermined direction).

The conveyor can include a turntable which is rotatable (preferably indexible) about a substantially vertical axis, and the stations are equidistant from each other in the circumferential direction of the turntable.

Each holder preferably comprises a main section and a receptacle (e.g., in the form of a relatively thin cassette) which has an open upper side for admission of a hanger The depth of each receptacle is preferably such that a portion at least of the hook of a hanger in the receptacle projects upwardly beyond the respective receptacle. The receptacles are movable up and down with reference to the respective main sections between raised and lowered positions, and each main section has a topmost portion. The hooks of hangers in the receptacles are disposed at a level below the respective topmost portions in the lowered positions of the receptacles. The aforementioned removing means includes means for engaging the hooks of hangers in raised positions of the receptacles in holders which are adjacent the third station. Such apparatus further comprises means for moving the receptacles relative to the respective main sections between the raised and lowered positions. The receptacles can be slidably mounted in the respective pockets for movement between raised and lowered positions.

The moving means can comprise a discrete moving unit for each receptacle, and such discrete moving units can be installed in the corresponding holders.

In accordance with one presently preferred embodiment of the apparatus, each main section comprises a substantially upright panel (e.g., in the form of a circular disc made of light-transmitting plastic material) which is preferably mounted on the conveyor for angular movement about a vertical axis. Such panels and the respective receptacles can jointly define pockets for garment hangers To this end, each receptacle has an open second side facing the respective main section Each main section can be provided with a window which is adjacent the second side of the respective receptacle, and each such receptacle comprises a sidewall which is remote from the main section and is provided with a recess having an open top. The width of each recess can approximate the width of the adjacent window. Such holders can be used with advantage for reception of hangers which have skirt- or trousers-supporting bars because the windows and the adjacent recesses permit convenient suspension of skirts and particularly trousers on the bars while the respective hangers are confined in their pockets. The width of the recesses and of the windows preferably equals or approximates the length of a bar. When the receptacles are maintained in lowered positions, the hangers in such receptacles extend at least to or above the edge faces beneath the windows of the respective main sections and above the edge faces at the bottoms of recesses in the sidewalls of the respective receptacles.

In lieu of the aforementioned discrete moving units in the holders, the means for moving the receptacles between raised and lowered positions can comprise upright carriers which are provided on the conveyor, one for each holder, a supporting member which is reciprocably mounted in each carrier and has an upper end connected with the respective receptacle and a lower end having or constituting a follower, and cam means disposed at the third station in the path of movement of followers to move successive supporting members and the respective receptacles to raised position during movement of holders along the endless path. The height of the cam means determines the difference between the levels of a receptacle in its raised and lowered positions. The cam is preferably disposed immediately ahead of and at the third station to ensure that the receptacles and the garment-supporting hangers therein are moved to raised positions and into the range of the hanger removing means not later than when they reach the third station The carriers can include tubes for the respective supporting members, and the panel-shaped main sections of the holders can be affixed to the carriers so that they extend upwardly beyond the respective carriers.

In accordance with a presently preferred embodiment, the hanger removing means comprises a lifting member and elevator means for moving the lifting member between a lower position in which the lifting member is located in the path of movement of a hook toward the third station, and an upper position in which the hook on the lifting member and the respective hanger are located above the holder at the third station so that the holder can advance toward the first or second station while the hanger remains suspended on the lifting member. The first station can coincide with the third station, i.e., a hanger which carries a garment can be removed from a holder at the first station before the inserting means introduces an empty hanger into the pocket of such holder. The lifting member can include a substantially horizontal arm which is located in the path of movement of a hook to the third station in raised position of the respective receptacle and in the lower position of the lifting member. The arm can include a substantially V-shaped or U-shaped portion for engagement with the hooks of garment hangers.

The apparatus preferably further comprises a ramp or an equivalent hanger receiving device with an upper end adjacent the arm of the lifting member when the lifting member is maintained in its upper position The removing means then further comprises means for transferring hooks from the arm of the lifting member onto the ramp. The transferring means can comprise a pivotable lever and means for pivoting the lever. Such pivoting means can comprise a fluid-operated motor.

The elevator means can comprise a cylinder, a piston which is reciprocable in the cylinder, and means for directly connecting the piston to the lifting member, e.g., to a slide which forms part of the lifting member and supports the aforementioned arm. The cylinder is preferably provided with a sealed slot through which the connecting means extends to directly couple the slide to the piston in the cylinder of the elevator means.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 3 is another elevational view of the apparatus as seen from the right-hand side of FIG. 1;

FIG. 4 is an enlarged view of a detail in the apparatus of FIG. 3;

FIG. 5 is a partly elevational and partly sectional view of another detail in the apparatus of FIGS. 1 to 3, the section being taken in the direction of arrows as seen from the line V-V of FIG. 6;

FIG. 6 is a plan view of a portion of the structure which is shown is FIG. 5;

FIG. 7 is a fragmentary perspective view of a second apparatus which employs modified holders for garment hangers and a modified mechanism for removal of garment-carrying hangers from the holders;

DESCRIPTION OF PREFERRED EMBODIMENTS

Figure 1:
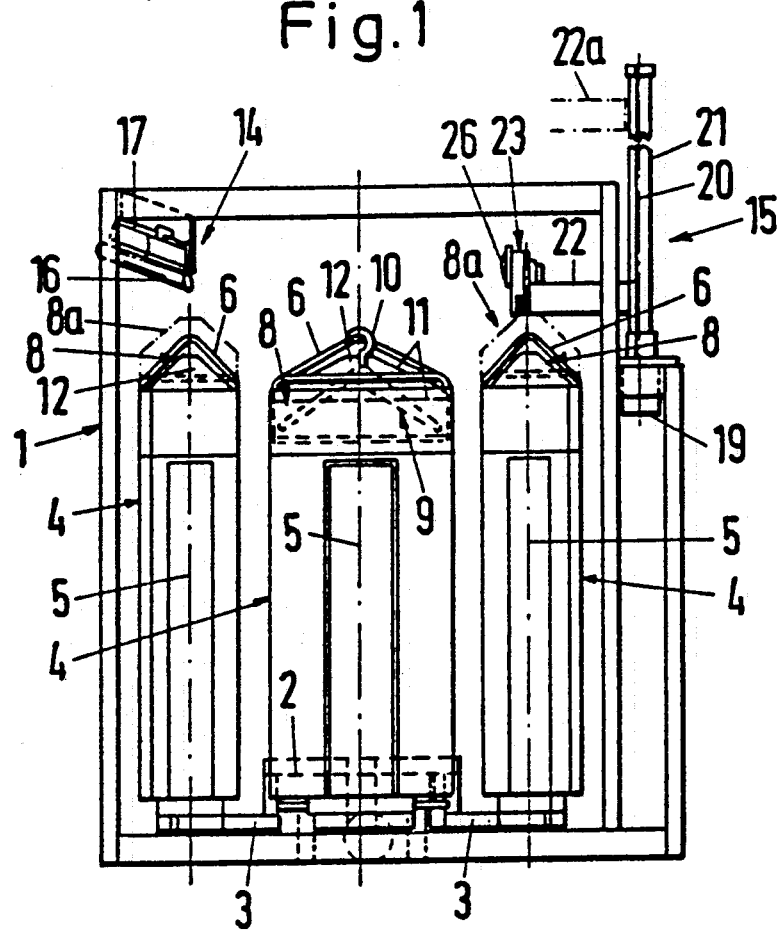
FIG. 1 is a schematic elevational view of an apparatus with three holders which embodies one form of the invention.

The apparatus which is shown in FIGS. 1 to 6 comprises a frame 1 for a conveyor 2 in the form of a turntable which is indexible about a vertical axis. The conveyor 2 supports three radially extending arms 3 which are disposed at angles of 120° relative to each other, and each arm 3 supports a discrete holder 4. The holders 4 are turnable with reference to the respective arms 3 about vertical axes 5. Each holder 4 resembles, either coarsely or rather closely, the upper part of a human torso, and each such holder comprises an upper or topmost portion 6 made of a length of tubular stock and having an inverted V-shaped configuration in simulation of human shoulders. The two sections of the upper portion 6 of each holder 4 make a large obtuse angle. The upper region of each holder 4 is further provided with a pocket 7 which has an open top and serves to receive a garment hanger 9 of the type having an upwardly extending hook 10. The hangers 9 are actually insertable into flat receptacles or cassettes 8 which are open from above and are movable up and down in the respective pockets 7 between raised positions 8a (see the right-hand portion of FIG. 1) and lowered positions corresponding to that of the receptacle 8 shown by solid lines in the left-hand portion of FIG. 1. The open upper side of each receptacle 8 is denoted by the character 11.

The depth of each receptacle 8 and of each pocket 7 is selected in such a way that the hook 10 of a hanger 9 which is properly inserted into a receptacle 8 extends, at least in part, beyond the upper side 11 of the receptacle. At the same time, at least a large portion of a hanger 9 which is properly inserted into a receptacle 8 is located at a level below the upper portion 6 of the respective holder 4.

Each receptacle 8 has a first sidewall 12 and a second sidewall 13. The sidewall 12 extends upwardly beyond the sidewall 13 and has an outline resembling that of human shoulders (see particularly FIGS. 1 and 3). The outline of the sidewall 12 resembles or matches that of the upper portion 6 of a holder 4.

When a receptacle 8 is caused to assume its lowered position, its sidewall 12 is located at a level below the upper portion 6 of the respective holder 4, i.e., the open upper side 11 of the receptacle 8 then assumes the position which is shown in the middle of FIG. 1. The means for moving the receptacles 8 between their raised and lowered positions comprises discrete moving units 4a, one for each holder 4. The units 4a are installed in the respective holders 4, and each such unit can comprise a cylinder and piston assembly (see FIG. 4) which can be operated with a pressurized hydraulic or gaseous fluid. FIG. 4 shows the respective receptacle 4 in the lowered position in which the open upper side 11 of such receptacle is located at a level well below the upper portion 6 of the respective holder 4. When the piston rod of the unit 4a is caused to move to its upper end position, the respective receptacle 8 is caused to assume its raised position 8a in which the hook 10 of the hanger 9 in the raised receptacle extends to a level above the upper portion 6 of the holder 4, i.e., to a level above the respective pocket 7.

The frame 1 supports an indexing device including a motor 34 (see FIG. 8) 1 by broken lines) which is installed below the conveyor 2 and can be actuated by a pedal so that it turns the conveyor 2 about a vertical axis to thereby move the three equidistant holders 4 along an endless path, always through angles of 120°. The exact details of the indexing device (which can be of any conventional design) form no part of the invention. It suffices to say that each depression of the pedal entails an angular movement of the conveyor 2 through 120° in the direction of arrow 28 (FIG. 2) before the motor 34 of the indexing device is arrested by a limit switch. One limit switch can be provided at each of the three equidistant stations adjacent the endless path of movement of the holders 4, and the conveyor 2 then carries a trip which actuates a limit switch whenever the holders 4 are indexed through 120°. Renewed depression of the pedal results in renewed indexing of the conveyor 2 through 120°. The three stations are distributed in such a way that each station is occupied by one of the holders 4 whenever the conveyor 2 comes to a standstill.

A first station 114 accommodates an inserting mechanism 14 which serves to introduce an empty garment hanger 9 into the receptacle 8 of the adjacent holder 4. A second station ST is located downstream or past the station 114 (as seen in the direction of arrow 28) and is accessible to an operator who applies one or more garments over the adjacent holder 4 and over the hanger 9 in the receptacle 8 of such holder. A third station 115 is located ahead of the station 114 but past the station ST and accommodates a removing or withdrawing mechanism 15 serving to remove the hanger 9 from the respective receptacle 8 together with the garment which has been applied to such hanger at the station ST.

Figure 2:
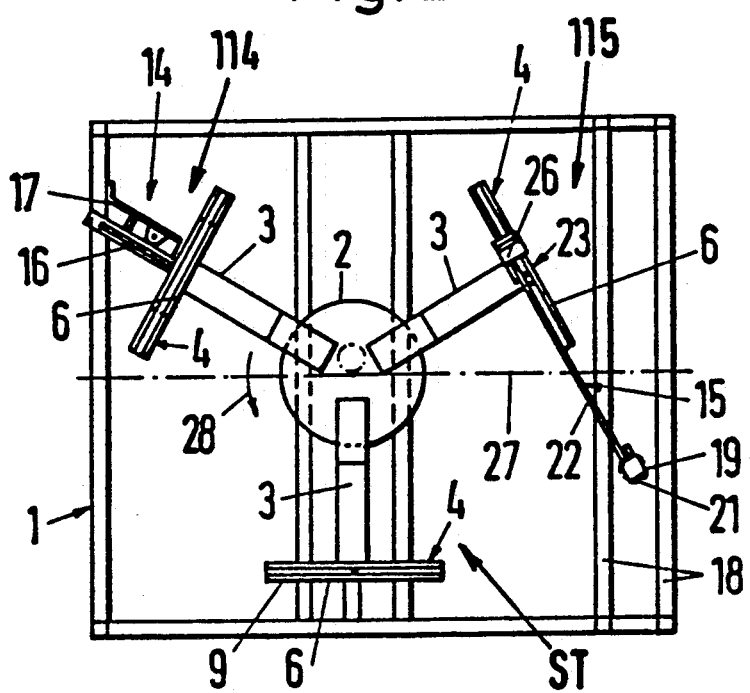
FIG. 2 is a plan view of the apparatus which is shown in FIG. 1.

The inserting mechanism 14 comprises a ramp 16 which slopes downwardly toward the station 114 and only the lowermost portion of which can be seen in FIGS. 1 to 3. The ramp 16 is parallel with a guide rail 17 for the hooks 10 of successive garment hangers 9. The ramp 16 and the guide rail 17 receive discrete hangers from a singularizing mechanism which can be of the type disclosed in copending patent application Ser. No. 301,511 filed Jan. 24, 1989 by Hans Heinold for "Apparatus for singularizing garment hangers" now U.S. Pat. No. 4,927,054. The arrangement is preferably such that the ramp 16 and guide rail 17 receive a discrete hanger 9 from the singularizing mechanism in response to each actuation of the indexing device so that a hanger 9 is located at the station 114 when the conveyor 2 comes to a halt in an angular position in which a discrete holder 4 is adjacent each of the stations 114, ST and 115. The lower end portion of the ramp 16 is located at a level above the pocket 7 of the holder 4 at the station 114. The guide rail 17 ensures that the hook 10 of a hanger 9 at the station 114 is properly oriented prior to introduction of the respective hanger into the adjacent receptacle 8.

The removing or withdrawing mechanism 15 comprises a motor 19 which is mounted on transversely extending member or members 18 of the frame 1 and has an output element rotatable about a vertical axis 20 and serving to change the angular position of a pneumatically operated elevator including a cylinder and piston assembly 21. The elevator 21 is movable about the axis 20 to and from the angular position of FIG. 2 in which the mechanism 15 is ready to remove a garment-carrying hanger 9 from the recess 8 of the adjacent holder 4. The mechanism 15 further comprises an arm 22 which extends transversely of the elevator 21 The free end portion of the arm 22 is provided with a gripper 23 having a fixed bifurcated gripping element or claw 24 and a mobile gripping element or claw 23. The latter can pivot about a horizontal axis. A drive 26 (such as a pneumatic motor) is provided to move the claw 25 between a substantially vertical or operative position (in which the hook 10 of a hanger 9 is clamped between the claws 24, 25 of the gripper 23) and an open or inoperative position 25a which is indicated in FIG. 6 by broken lines.

The upper portions 6 form part of main sections of the respective holders 4, and the receptacles 8 are movable up and down with reference to such main sections.

When the apparatus of FIGS. 1 to 6 is in use, an empty garment hanger 9 slides along the ramp 16 and guide rail 17 of the inserting mechanism 14 to reach the station 114 not later than when the indexing of the conveyor 2 is completed so that a holder 4 with an empty receptacle 8 in its pocket 7 reaches the station 114. The empty hanger 9 automatically descends into the receptacle 8 at the station 114. The conveyor 2 is then indexed again in response to depression of the pedal of the indexing device so that the holder 4 advances from the station 114 to the station ST by moving along its endless path in the direction of arrow 28. Thus, the holder 4 wherein the receptacle 8 confines a portion of an empty hanger 9 is then remote from the stations 114 and 115 where a careless operator could be injured by the mechanism 14 or 15. With reference to FIG. 2, the stations 114, 115 and the respective mechanisms 14, 15 are located at one side of a vertical plane 27 which includes the axis of the indexing device 101, and the station ST is located at the other side of such plane.

The operator sitting or standing at the station ST then applies a garment (such as a jacket, a coat, a blouse, a pullover, a shirt or the like) over the holder 4 and the hanger 9 at the station ST. At the same time, the mechanism 15 delivers an empty hanger 9 to the receptacle 8 of the holder 4 at the station 114, and the mechanism 15 removes a garment-carrying hanger 9 from the receptacle 8 in the holder 4 at the station 115. Thus, the output of the improved apparatus is much higher than that of a conventional apparatus wherein the loading of empty hangers and/or the removal of garment-carrying hangers must be interrupted while a garment is being applied over a hanger and over the respective holder.

The operator sets the motor 34 of the indexing device in motion when the application of a garment at the station ST is completed so that the respective holder 4 (with a garment-carrying hanger 9 therein) is advanced to the station 115 and is in the range of the removing mechanism 15. The holder 4 which contains a garment-carrying hanger 9 is then located beneath the gripper 23, and the moving means 4a in the respective holder 4 is actuated in automatic response to stoppage of the indexing device so that the receptacle 8 at the station 115 is moved to the raised position 8a and lifts the hanger 9, the garment on the hanger and the hook 10 of such hanger The hook 10 is into register with the space between the claws 24, 25 of the gripper 23 while the claw 25 assumes the position 25a. The hook 10 is then located at a level above the upper portion 6 of the holder 4 at the station 115 as well as above the collar (if any) of the garment on the respective hanger 9. The elevator 21 then lowers the arm 22 to ensure that the claw 24 is adjacent one side of the hook 10 before the claw 25 is pivoted by the drive 26 to move to its operative position in which the hook 10 is clamped between the claws 24 and 25. In the next step, the arm 22 is moved to the upper end position 22a (FIG. 1) and is pivoted about the axis 20 by the motor 19 and elevator 19 so that the hanger 9 and the garment thereon are removed from the holder 4 at the station 115. The hook 10 is then released to descend onto a further ramp (not shown) for sliding movement toward the next processing station.

Removal of a garment-carrying hanger 9 from the holder 4 at the station 115 takes place simultaneously with loading of an empty hanger into the receptacle 8 of the holder 4 at the station 114 and simultaneously with the application of one or more garments to the hanger 9 and holder 4 at the station ST. The motor 34 of the indexing device is then caused to index the conveyor 2 through 120° in the direction of arrow 28, and the aforedescribed sequence of steps at each of the stations 114, ST and 115 is repeated in the aforedescribed manner.

An important advantage of the improved apparatus is that at least one of the holders 4 is invariably available for the application of one or more garments to the hanger 9 in the respective receptacle 8, and that such available holder 4 is not located at the hanger inserting station 114 and/or at the hanger removing station 115. This not only contributes to a higher output of the apparatus (because one or more garments can be applied to the hanger 9 and holder 4 at the station ST while a hanger is inserted into the holder at the station 114 and a garment-carrying hanger is removed from a holder at the station 115) but also reduces the likelihood of injury to the operator or operators, especially if the mechanisms 14 and 15 are automated so that they need not be manipulated by hand. In addition, and if the indexing device is operated by a pedal which is to be depressed by the operator at the station ST, the operator can control the frequency of indexing of the conveyor 2 and holders 4, i.e., the operator can select the duration of intervals which elapse between successive operations of the indexing device Since the number of holders 4 preferably equals the number of stations (such number exceeds one), a discrete holder is available at each of the stations 114, ST and 115 whenever the conveyor 2 comes to a halt. At least one holder 4 is located outside of the stations 114, 115 (or outside a single station which replaces the stations 114, 115) when the motor 34 of the indexing device is idle, so that such holder is available for the application of articles of clothing to the hanger 9 in its pocket 7. It has been found that an apparatus with three equidistant stations (114, ST and 115) can deliver garment-carrying hanger 115 to the next processing station at a frequency much higher than that possible with heretofore known apparatus wherein the garment applying station coincides with the hanger inserting and/or hanger removing station.

The feature that at least a portion of the hook 10 of a hanger 9 in a receptacle 8 extends upwardly beyond the open upper side 11 of such receptacle, that at least the major part of the hook 10 is located beneath the upper portion 6 of the respective holder 4 in the lowered position of the receptacle, and that the hook 10 is readily accessible to parts of the removing mechanism 15 in the raised position of the respective receptacle 8 contributes to convenience and simplicity of operation of the apparatus. Moreover, This permits the application of any one of a wide variety of articles of clothing including jackets, pullovers, coats, blouses, shirts, vests and/or many others with normal or upwardly extending collars. One and the same type of hangers with standard hooks or with specially designed hooks can be used for suspension of a variety of different articles of clothing.

The feature that the receptacles 8 are movable up and down in the pockets 7 of the respective holders 4 is desirable and advantageous because each receptacle is accurately guided along many sides during movement between raised and lowered positions. While it is possible to install the moving means 4a externally of the holders 4, the illustrated mounting of moving means 4a in the respective holders is preferred at this time because this contributes to compactness of the apparatus and ensures that the moving means 4a are less likely to be damaged or contaminated.

Figure 8:
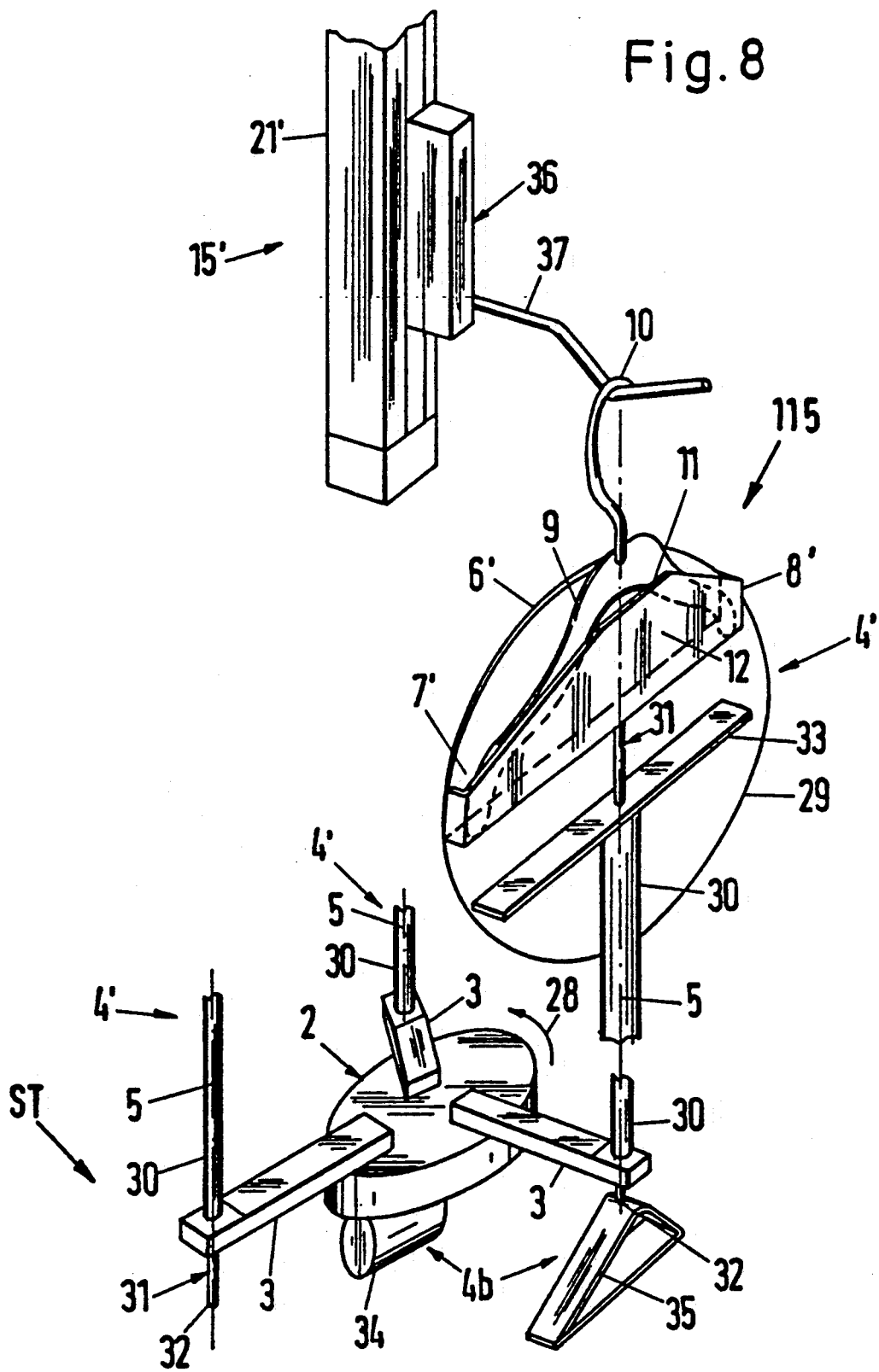
FIG. 8 illustrates the structure of FIG. 7 but in a different angular position of the conveyor, for the holders of garment hangers.
Figure 9:
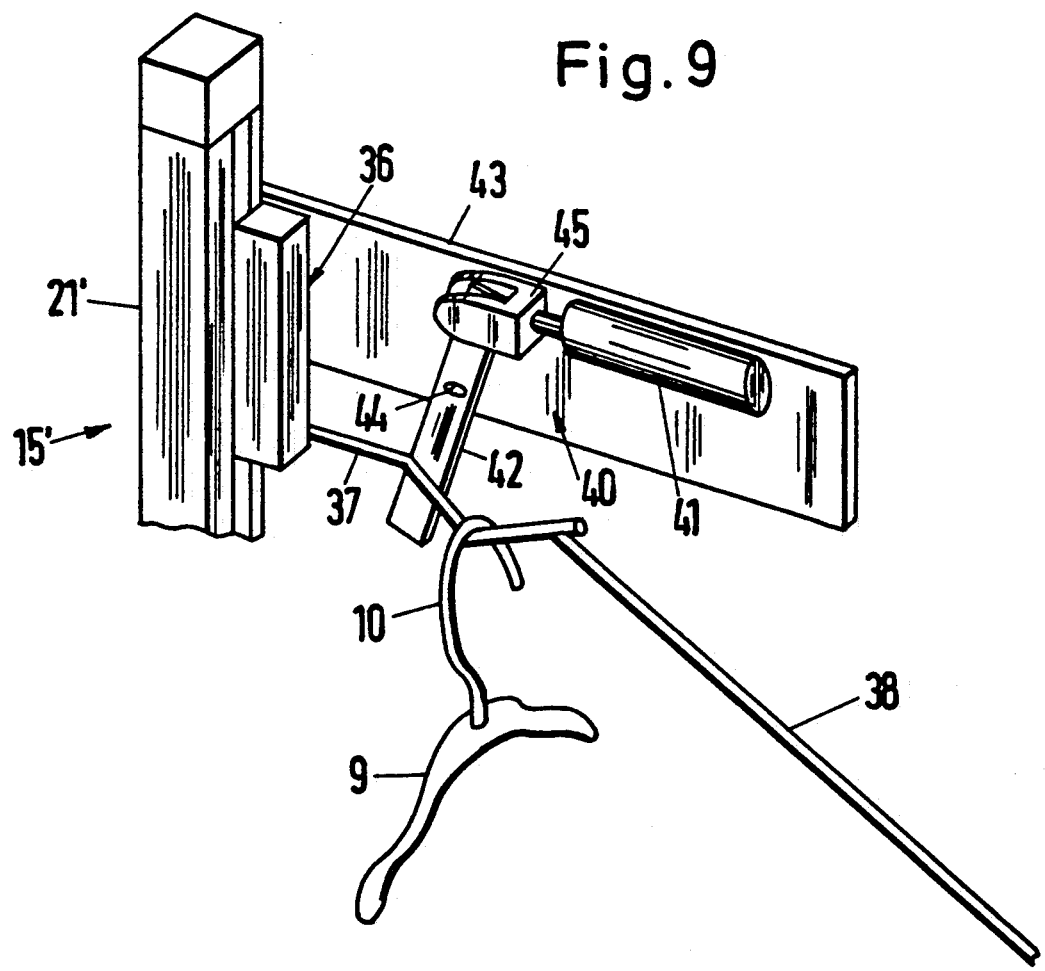
FIG. 9 illustrates a detail of the hanger removing mechanism in the apparatus of FIGS. 7 and 8.

FIGS. 7 to 9 show a portion of a second apparatus wherein the conveyor 2 and the hanger inserting mechanism (not shown) are or can be identical with those shown in FIGS. 1 to 6. The main difference is that the apparatus of FIGS. 7 to 9 employs modified holders 4' only one of which is fully shown. Furthermore, the apparatus of FIGS. 7 to 9 employs a modified hanger removing mechanism 15'.

The illustrated holder 4' comprises a main section in the form of a circular plate or panel 29 which is preferably made of a light-transmitting plastic material and is secured to one side of the upper portion of an upright tubular carrier 30 The lower end portion of the carrier 30 is rotatably mounted on the respective arm 3 of the conveyor 2 so that the main section or panel 29 can orbit about the respective vertical axis 5. An elongated rod-shaped supporting member 31 is axially movably telescoped into the carrier 30 in such a way that the lower end portion 32 of the member 31 extends through a bore or hole in and downwardly beyond the respective arm 3 of the conveyor 2. The upper end portion of the member 31 is affixed to the receptacle 8' of the holder 4'. As can be seen in FIG. 8, the main section 29 extends upwardly beyond the carrier 30 and is further affixed to a horizontal ledge 33 at the upper end of the carrier 30. The ledge 33 has a hole or bore for the upper portion of the member 31.

The receptacle 8' has a substantially U-shaped horizontal cross-sectional outline and has an open side confronting the section 29. The pocket 7' is defined by the section 29 jointly with the receptacle 8'.

The means 4b for moving the receptacle 8' between raised and lowered positions includes the aforementioned member 31 and a cam 35 which is adjacent the station 115, i.e., the station for the modified withdrawing mechanism 15'. The lower end portion 32 of the member 31 constitutes a follower which tracks the upwardly sloping portion of the cam 35 while the conveyor 2 is indexed and approaches the end of its angular movement through 120°. This ensures that the receptacle 8' is raised not later than when the respective holder 4' reaches the station 115. The height of the cam 35 determines the distance between the raised and lowered positions of the receptacle 8'.

The mechanism 15' comprises an elevator 21' in the form of a cylinder and piston assembly which can raise and lower a suitably bent arm 37 for the hook 10 of a hanger 9 in the receptacle 8' of the holder 4' at the station 115. The arm 37 is substantially horizontal and includes a V-shaped portion which can be engaged by the topmost portion of a hook 10 to ensure that the hook remains on the arm 37, i.e., that the hook is not likely to slide longitudinally of and toward the free end of the arm. The arm 37 is actually mounted on a slide 36 which is movable up and down along the cylinder of the elevator 21'. When the elevator 21' has been actuated to move the slide 36 and the arm 37 to their lower end positions, the arm 37 is located in the path of movement of the oncoming hook 10 (at such time, the respective receptacle 8' is maintained in raised position by the respective member 31 which cooperates with the cam 35 at the station 115). The cylinder of the elevator 21' preferably contains a piston without a piston rod, and such piston is affixed to the slide 36 by a connector (not shown) extending through a vertical slot in the cylinder of the elevator 21'. The slot in the cylinder of the elevator 21' is sealed from the surrounding atmosphere. Elevators of the type capable of being used in the mechanism 15' of FIGS. 7 to 9 are known at Typ IS and are distributed by ORIGA GmbH Pneumatik, Filderstadt, Federal Republic of Germany.

When the arm 37 is maintained in the raised position of FIG. 9, it is adjacent the upper end portion of a downwardly sloping ramp 38, and the hook 10 of the garment hanger 9 which is suspended on the arm 37 is located in the path of movement of a pivotable transfer element 42 in the form of a two-armed lever. The pivot member 44 for the element 42 is secured to a horizontal plate-like support 43 which is affixed to the cylinder of the elevator 21'. The lower arm of the element 42 can transfer the hook 10 from the arm 37 onto the ramp 38 in response to pivoting of the element 42 by a yoke 45 which is affixed to the upper arm of the element 42. The yoke 45 forms part of a pivoting device 40 which further includes a fluid-operated motor 41 affixed to the support 43 and including a cylinder for a piston having a piston rod which carries the yoke 45. The cylinder of the motor 41 preferably contains a spring (not shown) which permanently biases the piston, the piston rod and the yoke 45 to the inoperative positions in which the element 42 assumes the angular position of FIG. 9. The element 42 is pivotable in a substantially vertical plane adjacent the plane of the support 43.

The mode of operation of apparatus employing holders 4' and a hanger removing mechanism 15' of the type shown in FIGS. 7 to 9 is analogous to the mode of operation of the apparatus of FIGS. 1 to 6. Thus, when an empty holder 4' reaches the station 114, its receptacle 8' receives an empty hanger 9 (such hanger is actually delivered into the pocket 7' between the receptacle 8' and the adjacent main section 29 of the holder 4'). The holder 4' is then indexed to advance to the station ST where it is provided with a garment which is slipped onto the hanger 9 in the pocket 7'. In the next step, the holder 4' (with a hanger 9 in the pocket 7' and with a garment on such hanger) is indexed to the station 115. This causes the receptacle 8' to rise with the garment-carrying hanger 9 because the follower 32 of the respective member 31 slides along the upwardly sloping portion of the cam 35 from the position of FIG. 7 to the position of FIG. 8 so that the receptacle 8' is caused to assume the raised position of FIG. 8. At such time, the elevator 21' maintains the arm 37 in the lower end position so that the free end portion of the arm 37 is received within the hook 10 of the oncoming hanger 9. The elevator 21' can be actuated in response to depression of a pedal or in automatic response to completion of indexing of the conveyor 2 so that the arm 37 rises and lifts the hook 10, the respective hanger 9 and the garment on such hanger. When the arm 37 reaches the upper end position of FIG. 9, the pivoting device 40 is actuated (e.g., in automatic response to lifting of the arm 37 to its upper end position) to pivot the element 42 in a counterclockwise direction so that the lower arm of the element 42 transfers the hook 10 from the arm 37 onto the ramp 38. For example, the rising slide 36 for the arm 37 an actuate a limit switch (not shown) which actuates the device 40 in order to effect the transfer of the lifted hanger 9 and of the garment on such hanger onto the ramp 38 on which the hook 10 slides toward the next processing station. The limit switch can actuate a solenoid valve which admits a pressurized fluid (e.g., compressed air) into the cylinder of the motor 41 to cause the piston of the motor 41 to stress the aforementioned spring while pivoting the element 42 in a counterclockwise direction.

An advantage of the holders 4' is their simplicity and compactness. Thus, the main sections 29 cooperate with the respective receptacles 8' to define pockets 7' for garment hangers 9. The receptacles 8' cannot turn relative to the adjacent main sections 29 because they are immediately or closely adjacent such main sections.

The apparatus of FIGS. 7 to 9 exhibits the additional advantage that the means 4b for moving the receptacles 8' between raised and lowered positions need not employ discrete motors. Lifting of successive receptacles 8' which approach the station 115 takes place automatically in response to indexing of the conveyor 2 because the indexing device including the motor 34 compels the followers 32 of successive members 31 to slide along the cam 35 when the respective receptacles 8' approach the station 115 where the hangers 9 must be maintained in raised positions so that their hooks 10 can be engaged and thereupon lifted by the arm 37.

As can be seen in FIG. 7, the entire hook 10 of the hanger 9 in the receptacle 8' which is remote from the station 115 is located at a level beneath the upper or topmost portion 6' of the main section 29. This is desirable and advantageous because the hook 10 cannot interfere with the application of one or more articles of clothing (e.g., a vest and a jacket) over the holder 4' and the hanger 9 therein The hook 10 rises above the main section 29 only when the follower 32 of the respective member 31 slides along the cam 35 on its way to the station 115.

The apparatus of FIGS. 7 to 9 further exhibits the advantage that the hooks 10 of hangers 9 which arrive at the station 115 need not be engaged by pairs of claws. Instead, such hooks 10 automatically assume optimum positions with reference to the lowered arm 37 so that the latter can be lifted by the elevator 21' as soon as the respective holder 4' reaches the station 115.

The elevator 21' exhibits the advantage that it occupies little room because its piston is directly connected to the slide 36 which carries the arm 37. This renders it possible to dispense with a piston rod and to thus reduce the overall height of the elevator 21'.

Figure 10:
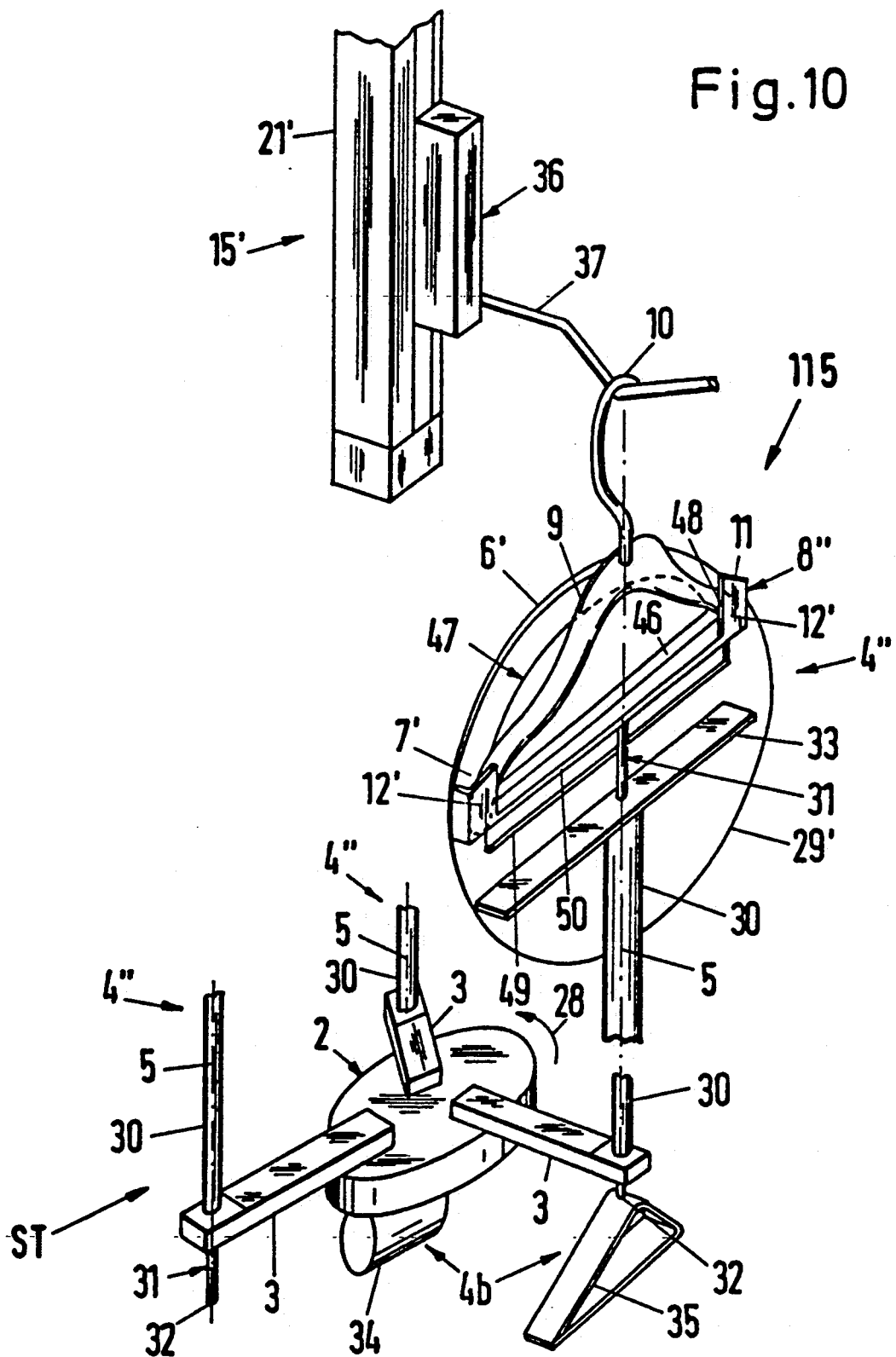
FIG. 10 is a fragmentary perspective view of a third apparatus with holders which constitute modifications of holders of the type shown in FIGS. 7 to 9 and are designed to permit suspension of trousers or skirts on garment hangers.

FIG. 10 shows a portion of a third apparatus which employs three equidistant holders 4" each of which constitutes a modification of the holders 4' of FIGS. 7 to 9. A holder 4" of the type shown in FIG. 10 is designed in such a way that it can accept hangers 9 of the type having a hook 10 and a horizontal skirt- or trousers-supporting bar 46. In addition, the hanger 9 can support a jacket, a blouse or a like article of clothing.

The main section 29' of each holder 4" includes a window 47 which extends along an arc of approximately 180° and is bounded from below by an edge face 49 slightly above the ledge 33. The receptacle 8" has a sidewall 12' which is spaced apart from the main section 29', and that side of the receptacle 8" which is adjacent the section 29' is open. The sidewall 12' of the receptacle 8" has a recess 48 which is open at the top and is bounded from below by an edge face 50 located at a level above the edge face 49 of the section 29' when the cam 35 maintains the member 31 and the receptacle 8" in the raised positions of FIG. 10 (because the holder 4" shown in the right-hand portion of FIG. 10 is located at the hanger removing station 115). The length of the bar 46 equals or approximates the length of the edge portion 49 and/or 50, i.e., the width of the window 47 and/or recess 48 at least approximates the length of the bar 46. This bar is located at the level of the edge face 49 in lowered position of the receptacle 8".

The depth of the recess 48 can be reduced without departing from the spirit of the invention. For example, the edge face 50 at the bottom of the recess 48 can be located at the level of the bar 46 of a hanger 9 which is properly inserted into the pocket 7' between the main section 29' and the receptacle 8" of the holder 4".

If the operator wishes to suspend a pair of trousers on the bar 46 of the hanger 9 at the station ST (i.e., at the station where the receptacle 8" is maintained in the lowered position because the follower 32 of the respective member 31 is remote from the cam 35), one-half of the trousers is caused to pass through the window 47, through the space between the bar 46 and the main portion of the hanger 9 in the receptacle 8", and through the recess 48 of the receptacle 8". Thus, one half of the trousers is caused to hang along the outer side of the main section 29' and the other half is caused to hang along the outer side of the sidewall 12'. Another article of clothing, e.g., a jacket belonging to the trousers, is or can be applied over the hanger 9 in the customary way before the holder 4" is indexed to advance from the station ST to the station 115. Once the holder 4" has reached the station 115, the hanger 9 is removed from the pocket 7' (with the jacket and trousers) in the same way as described with reference to FIGS. 7 to 9.

The improved apparatus can be modified in a number of additional ways. For example, the hanger inserting station 114 can coincide with the garment removing station 115, and the conveyor 2 (with only two hangers 4, 4' or 4" thereon) is then indexible through angles of 180°. Such simplification of the improved apparatus need not necessarily entail a reduction of the output if the inserting mechanism 14 and the removing mechanism 15 or 15' can operate in such a way that a garment can be removed from a holder 4, 4' or 4" and a fresh hanger can be inserted into the pocket of such holder within the interval of time which is required to apply one or more articles of clothing to the hanger and holder at the station ST. In fact, the mechanisms 14, 15 or 14, 15' can complete the removal of a garment-carrying hanger and the insertion of an empty hanger within an interval of time which is or can be much shorter than the interval of time which elapses during application of one or more articles of clothing to a holder 4, 4' or 4" and to the hanger 9 in such holder at the station ST.

It is equally possible to increase the number of stations adjacent the endless path of movement of holders 4, 4', 4" to more than three. For example, a fourth station can be provided between the stations ST and 115 of FIG. 2 in order to permit inspection of the applied garment or garments by a person other than the person in charge of placing garments onto the hangers and holders at the station ST.

It is further within the purview of the invention to replace the illustrated conveyor 2 in the form of a turntable with a different conveyor, e.g., with an endless chain conveyor wherein an endless chain is trained over two or more sprocket wheels to be intermittently driven in a horizontal plane and to carry two or more discrete holders for garment hangers.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for suspending garments on hangers of the type having a hook, comprising a plurality of garment holders each resembling the upper part of a human torso and each having an open-top hanger-receiving pocket, a main section and a receptacle which is movably installed in the respective main section and has an open upper side for admission of a hanger, the depth of each of said receptacles being such that at least the hook of a hanger in the receptacle projects upwardly beyond the respective receptacle, said receptacles being movable up and down in the respective main sections between raised and lowered positions, said main sections having topmost portions and the hooks of hangers in said receptacles being disposed at a level below the respective topmost portions in the lowered positions of said receptacles; a conveyor supporting and defining an endless path for said holders; and a plurality of stations including a first station adjacent said path and having means for inserting hangers into the pockets of adjacent holders so that the hook of an inserted hanger extends upwardly, and a second station adjacent said path to facilitate the application of a garment over a holder and over the hanger in the pocket of such holder, one of said holders being located at said first station when another of said holders is located at said second station.

2. The apparatus of claim 1, wherein said stations are equidistant from each other.

3. The apparatus of claim 1, comprising three equidistant holders, said stations further including a third station adjacent said path and having means for removing garment-carrying hangers from the pockets of adjacent holders.

4. The apparatus of claim 3, wherein said conveyor includes means for moving said holders in a predetermined direction, said third station being disposed ahead of said first station.

5. The apparatus of claim 1, wherein said conveyor includes a turntable which is rotatable about a substantially vertical axis and said stations are equidistant from each other in the circumferential direction of said turntable.

6. The apparatus of claim 1, wherein said stations further include a third station adjacent said path and having means for removing garment-carrying hangers from the adjacent receptacles, said removing means having means for engaging the hooks of hangers in raised positions of receptacles adjacent said third station.

7. The apparatus of claim 6, further comprising means for moving said receptacles relative to the respective main sections between said raised and lowered positions.

8. The apparatus of claim 7, wherein said receptacles are slidable up and down in the pockets of the respective holders.

9. The apparatus of claim 7, wherein said moving means includes a discrete moving unit for each of said holders.

10. The apparatus of claim 9, wherein said units are installed in the respective main sections.

11. The apparatus of claim 1, wherein each of said main sections comprises a substantially upright panel on said conveyor, said receptacles and said panels jointly defining the pockets of the respective holders.

12. The apparatus of claim 11, wherein said receptacles have open second sides confronting the respective panels.

13. The apparatus of claim 12, wherein each of said panels has a window adjacent the second side of the respective receptacle and each receptacle comprises a sidewall remote from the respective panel and provided with a recess having an open top, the width of each recess approximating the width of the respective window.

14. The apparatus of claim 13 for suspending garments on hangers of the type having a skirt- and optionally trousers-supporting bar of predetermined length, the width of said recesses and said windows at least approximating said predetermined length.

15. The apparatus of claim 13, wherein said panels having fist edge faces beneath the respective windows and said sidewalls have second edge faces beneath the respective recesses, the hangers in said receptacles extending at least to the levels of the edge faces of the respective panels and sidewalls in lowered positions of said receptacles.

16. The apparatus of claim 1, further comprising means for moving said receptacles relative to the respective main sections including upright carriers provided on said conveyor, one for each of said holders, a supporting member reciprocably mounted in each carrier and having an upper end connected with the respective receptacle and a lower end extending beyond the respective carrier and having a follower, and cam means disposed at one of said stations in the path of movement of said followers to move successive supporting members and the corresponding receptacles to said raised positions during movement of said holders along said endless path.

17. The apparatus of claim 16, wherein said cam means has a height approximating the distance of raised and lowered positions of a receptacle from each other.

18. The apparatus of claim 16, wherein said stations further include a third station adjacent said path and having means for removing garment-carrying hangers from the adjacent receptacles, said conveyor being arranged to move said holders in a predetermined direction and said cam means being disposed immediately ahead of said third station so that said receptacles assume raised positions during removal of garment-carrying hangers therefrom.

19. The apparatus of claim 16, wherein said carriers include tubes for the respective supporting members and said main sections include panels which are affixed to and extend upwardly beyond the respective carriers.

20. The apparatus of claim 1, wherein said stations further include a third station adjacent said path and having means for removing garment-carrying hangers from the adjacent receptacles, said removing means including a lifting member and elevator means for moving said lifting member between a lower position in which the lifting member is located in the path of movement of a hook toward said third station and an upper position in which the hook on said lifting member and the respective hanger are located above the holder at said third station.

21. The apparatus of claim 20, wherein said lifting member includes a substantially horizontal arm which is located in the path of movement of a hook to said third station in raised position of the respective receptacle and in the lower position of said lifting member.

22. The apparatus of claim 21, wherein said arm includes a substantially V-shaped portion for engagement with the hooks of garment hangers.

23. The apparatus of claim 21, further comprising a ramp having an upper end portion adjacent said arm in the upper position of said lifting member, said removing means further comprising means for transferring hooks from said arm onto said ramp.

24. The apparatus of claim 23, wherein said transferring means includes a lever and means for pivoting said lever.

25. The apparatus of claim 24, wherein said pivoting means comprises a fluid-operated motor.

* * * * *